US008844972B2

(12) United States Patent
Riley et al.

(10) Patent No.: US 8,844,972 B2
(45) Date of Patent: Sep. 30, 2014

(54) BUSINESS FORM COMPRISING A WRISTBAND WITH MULTIPLE IMAGING AREAS

(75) Inventors: James M. Riley, Saint Louis, MO (US); Sanjay K. Jain, Saint Louis, MO (US); Mark Greer, O'Fallon, MO (US)

(73) Assignee: Laser Band, LLC, Saint Louis, MI (US)

( * ) Notice: Subject to any disclaimer, the term of this patent is extended or adjusted under 35 U.S.C. 154(b) by 821 days.

(21) Appl. No.: 12/819,709

(22) Filed: Jun. 21, 2010

(65) Prior Publication Data

US 2010/0253060 A1 Oct. 7, 2010

Related U.S. Application Data

(62) Division of application No. 11/405,149, filed on Apr. 17, 2006, now Pat. No. 7,763,344.

(51) Int. Cl.

| | |
|---|---|
| ***G09C 3/00*** | (2006.01) |
| ***B42D 15/00*** | (2006.01) |
| ***B42D 15/10*** | (2006.01) |

(52) U.S. Cl.

USPC .................. 283/75; 283/67; 283/70; 283/72; 283/74; 283/81; 283/94; 283/98; 283/99; 283/106; 283/107; 283/109; 283/900

(58) Field of Classification Search

USPC ........ 281/2, 5, 51; 283/61, 62, 67, 70, 72, 74, 283/75, 81, 94, 98, 99, 106, 107, 109, 117, 283/900

See application file for complete search history.

(56) References Cited

U.S. PATENT DOCUMENTS

| | | | |
|---|---|---|---|
| 230,455 | A | 7/1880 | Wilcox |
| 919,983 | A | 4/1909 | Walsh |
| 922,948 | A | 5/1909 | Portmore |
| 1,383,335 | A | 7/1921 | Penksa |
| 1,517,456 | A | 12/1924 | Pulliam |
| 2,054,227 | A | 9/1936 | Nichols |
| 2,073,280 | A | 3/1937 | Lederer |
| 2,553,676 | A | 5/1951 | Roos |

(Continued)

FOREIGN PATENT DOCUMENTS

| | | |
|---|---|---|
| DE | 202009015077 U1 | 1/2010 |
| EP | 1039431 | 9/2000 |

(Continued)

OTHER PUBLICATIONS

"Yes, Sir, That's My Baby!," Material Management in Health Care, Feb. 1999, vol. 8, No. 2, Health Forum, Inc.

(Continued)

*Primary Examiner* — Shelley Self
*Assistant Examiner* — Justin V Lewis
(74) *Attorney, Agent, or Firm* — Alston & Bird LLP

(57) ABSTRACT

A self laminating wristband separable from a multi-ply page form has a plurality of separated imaging areas, with one larger imaging area for receiving printed data corresponding to the wearer such as his name, i.d. number, etc., with one or more second imaging areas adapted to receive either printed information or markers which may be adhered thereto. The separated imaging areas are aligned along the length of the wristband so that the gap between them acts as a natural hinge point which allows the imaging areas to lie flatter against the wearer's wrist.

13 Claims, 12 Drawing Sheets

(56) References Cited

U.S. PATENT DOCUMENTS

| | | | |
|---|---|---|---|
| 2,641,074 | A | 6/1953 | Richmond |
| 2,687,978 | A | 8/1954 | Vogt |
| 3,153,869 | A | 10/1964 | Twentier |
| 3,197,899 | A | 8/1965 | Twentie |
| 3,402,808 | A | 9/1968 | Yannuzzi |
| 3,517,802 | A | 6/1970 | Petrie |
| 3,585,743 | A | 6/1971 | Jeffers |
| 3,660,916 | A | 5/1972 | McDermott et al. |
| 3,854,229 | A | 12/1974 | Morgan |
| 4,004,362 | A | 1/1977 | Barbieri |
| 4,078,324 | A | 3/1978 | Wiebe |
| 4,179,833 | A | 12/1979 | Knodel |
| 4,226,036 | A | 10/1980 | Krug |
| 4,233,715 | A | 11/1980 | McDermott |
| 4,370,370 | A | 1/1983 | Iwata et al. |
| 4,565,731 | A | 1/1986 | Komatsu et al. |
| 4,612,718 | A | 9/1986 | Golub et al. |
| 4,627,994 | A | 12/1986 | Welsch |
| 4,630,384 | A | 12/1986 | Breen |
| 4,682,431 | A | 7/1987 | Kowalchuk et al. |
| 4,696,843 | A | 9/1987 | Schmidt |
| 4,783,917 | A | 11/1988 | Smith et al. |
| 4,829,604 | A | 5/1989 | Allen et al. |
| 4,854,610 | A | 8/1989 | Kwiatek |
| 4,855,277 | A | 8/1989 | Walter |
| 4,914,843 | A | 4/1990 | DeWoskin |
| 4,941,210 | A | 7/1990 | Konucik |
| 4,950,638 | A | 8/1990 | Yuyama et al. |
| 4,956,931 | A | 9/1990 | Selke |
| 4,978,144 | A | 12/1990 | Schmidt et al. |
| 4,991,337 | A | 2/1991 | Solon |
| RE33,616 | E | 6/1991 | Welsch |
| 5,026,084 | A | 6/1991 | Pasfield |
| 5,045,426 | A | 9/1991 | Maierson et al. |
| 5,135,789 | A | 8/1992 | Schmidt |
| 5,222,823 | A | 6/1993 | Conforti |
| 5,227,004 | A | 7/1993 | Belger |
| 5,227,209 | A | 7/1993 | Garland |
| 5,283,969 | A | 2/1994 | Weiss |
| 5,311,689 | A | 5/1994 | Lindsey |
| 5,318,326 | A | 6/1994 | Garrison |
| 5,331,140 | A | 7/1994 | Stephany |
| 5,351,993 | A | 10/1994 | Wright et al. |
| 5,370,420 | A | 12/1994 | Khatib et al. |
| 5,381,617 | A | 1/1995 | Schwartztol et al. |
| 5,383,686 | A | 1/1995 | Laurash |
| 5,395,667 | A | 3/1995 | Ohno et al. |
| 5,418,026 | A | 5/1995 | Dronzek, Jr. et al. |
| 5,427,416 | A | 6/1995 | Birch et al. |
| 5,486,021 | A | 1/1996 | Laurash |
| 5,486,436 | A | 1/1996 | Lakes |
| 5,509,693 | A | 4/1996 | Kohls |
| 5,509,694 | A | 4/1996 | Laurash et al. |
| 5,518,787 | A | 5/1996 | Konkol |
| 5,524,934 | A | 6/1996 | Schwan et al. |
| 5,547,227 | A | 8/1996 | Laurash et al. |
| 5,560,657 | A | 10/1996 | Morgan |
| 5,581,924 | A | 12/1996 | Peterson |
| 5,586,788 | A | 12/1996 | Laurash |
| 5,595,404 | A | 1/1997 | Skees |
| 5,596,202 | A | 1/1997 | Arakawa |
| 5,598,970 | A | 2/1997 | Mudry et al. |
| 5,601,222 | A | 2/1997 | Haddad |
| 5,601,313 | A | 2/1997 | Konkol et al. |
| 5,630,627 | A | 5/1997 | Stewart |
| 5,637,369 | A | 6/1997 | Stewart |
| 5,648,143 | A | 7/1997 | Mehta et al. |
| 5,653,472 | A | 8/1997 | Huddleston et al. |
| 5,662,976 | A | 9/1997 | Popat et al. |
| 5,670,015 | A | 9/1997 | Finestone et al. |
| 5,687,903 | A | 11/1997 | Akridge et al. |
| 5,765,885 | A | 6/1998 | Netto et al. |
| 5,785,354 | A | 7/1998 | Haas |
| 5,842,722 | A | 12/1998 | Carlson |
| 5,877,742 | A | 3/1999 | Klink |
| 5,933,993 | A | 8/1999 | Riley |
| 5,984,363 | A | 11/1999 | Dotson et al. |
| 6,000,160 | A | 12/1999 | Riley |
| 6,006,460 | A | 12/1999 | Blackmer |
| 6,016,618 | A | 1/2000 | Attia et al. |
| 6,053,535 | A | 4/2000 | Washburn et al. |
| 6,055,756 | A | 5/2000 | Aoki |
| 6,058,639 | A | 5/2000 | Tinklenberg et al. |
| 6,067,739 | A | 5/2000 | Riley |
| 6,071,585 | A | 6/2000 | Roth |
| 6,092,321 | A | 7/2000 | Cheng et al. |
| 6,108,876 | A | 8/2000 | Hubbert |
| 6,155,476 | A | 12/2000 | Fabel |
| 6,155,603 | A | 12/2000 | Fox |
| 6,159,570 | A | 12/2000 | Ulrich et al. |
| 6,199,730 | B1 | 3/2001 | Chisolm |
| 6,303,539 | B1 | 10/2001 | Kosarew |
| 6,331,018 | B1 | 12/2001 | Roth et al. |
| 6,343,819 | B1 | 2/2002 | Shiozaki |
| 6,361,078 | B1 | 3/2002 | Chess |
| 6,409,871 | B1 | 6/2002 | Washburn et al. |
| 6,438,881 | B1 | 8/2002 | Riley |
| 6,510,634 | B1 | 1/2003 | Riley |
| 6,517,921 | B2 | 2/2003 | Ulrich et al. |
| 6,611,962 | B2 | 9/2003 | Redwood et al. |
| 6,641,048 | B1 | 11/2003 | Schintz et al. |
| 6,685,228 | B2 | 2/2004 | Riley |
| 6,748,687 | B2 | 6/2004 | Riley |
| 6,782,648 | B1 | 8/2004 | Mosher, Jr. |
| 6,807,680 | B2 | 10/2004 | Sloot |
| 6,836,215 | B1 | 12/2004 | Laurash et al. |
| 6,844,041 | B2 | 1/2005 | Squier et al. |
| 6,863,311 | B2 | 3/2005 | Riley |
| 6,981,948 | B2 | 1/2006 | Pellegrino et al. |
| 7,017,293 | B2 | 3/2006 | Riley |
| 7,017,294 | B2 | 3/2006 | Riley |
| 7,047,682 | B2 | 5/2006 | Riley |
| 7,197,842 | B2 | 4/2007 | Ali |
| 7,222,448 | B2 * | 5/2007 | Riley .............................. 283/75 |
| 7,240,446 | B2 | 7/2007 | Bekker |
| 7,286,055 | B2 | 10/2007 | Girvin et al. |
| 7,523,576 | B1 | 4/2009 | Petty |
| 7,763,344 | B2 | 7/2010 | Riley et al. |
| 7,779,569 | B2 | 8/2010 | Riley et al. |
| 7,779,570 | B2 | 8/2010 | Riley |
| 7,784,209 | B2 | 8/2010 | Greer |
| 7,784,210 | B2 | 8/2010 | Riley et al. |
| 2002/0152928 | A1 | 10/2002 | Lawandy et al. |
| 2002/0176973 | A1 | 11/2002 | Keiser |
| 2003/0001381 | A1 | 1/2003 | Riley |
| 2003/0003249 | A1 | 1/2003 | Benim et al. |
| 2003/0011190 | A1 | 1/2003 | Ryan |
| 2004/0068906 | A1 | 4/2004 | Riley |
| 2004/0128892 | A1 | 7/2004 | Valenti |
| 2004/0244251 | A1 | 12/2004 | Riley |
| 2005/0091896 | A1 | 5/2005 | Kotik et al. |
| 2005/0108912 | A1 | 5/2005 | Bekker |
| 2005/0279001 | A1 | 12/2005 | Riley |
| 2005/0281989 | A1 | 12/2005 | Finger |
| 2006/0230661 | A1 | 10/2006 | Bekker |
| 2006/0236578 | A1 | 10/2006 | Saint et al. |
| 2006/0242875 | A1 | 11/2006 | Wilson et al. |
| 2006/0261958 | A1 | 11/2006 | Klein |
| 2007/0089342 | A1 | 4/2007 | Jain et al. |
| 2007/0120358 | A1 | 5/2007 | Waggoner et al. |
| 2007/0243361 | A1 | 10/2007 | Riley et al. |
| 2007/0257113 | A1 | 11/2007 | Davis et al. |
| 2008/0098636 | A1 | 5/2008 | Greer |
| 2009/0031602 | A1 | 2/2009 | Riley |
| 2009/0094872 | A1 | 4/2009 | Ali et al. |
| 2009/0094873 | A1 | 4/2009 | Riley |
| 2009/0193701 | A1 | 8/2009 | Greer |
| 2009/0277061 | A1 | 11/2009 | Jain et al. |

(56) References Cited

U.S. PATENT DOCUMENTS

| | | | |
|---|---|---|---|
| 2009/0282717 | A1 | 11/2009 | Jain et al. |
| 2010/0071241 | A1 | 3/2010 | Jain et al. |

FOREIGN PATENT DOCUMENTS

| | | | |
|---|---|---|---|
| EP | 1974603 | A2 | 10/2008 |
| FR | 2806594 | A | 9/2001 |
| GB | 960859 | | 6/1964 |
| GB | 2045718 | | 11/1980 |
| GB | 2160492 | | 12/1985 |
| GB | 2228915 | A | 9/1990 |
| JP | 5-61777 | | 8/1993 |
| JP | 08-190350 | | 7/1996 |
| JP | 3032299 | | 12/1996 |
| JP | 10-207374 | | 8/1998 |
| JP | 11015383 | A | 1/1999 |
| JP | 2001316921 | A | 11/2001 |
| JP | 2002351321 | A | 12/2002 |
| JP | 2003066849 | | 3/2003 |
| JP | 2003157010 | | 5/2003 |
| JP | 2003164307 | | 6/2003 |
| JP | 2006039209 | | 2/2006 |
| WO | 95/02877 | | 1/1995 |
| WO | 96/12618 | | 5/1996 |
| WO | 98/23081 | | 5/1998 |
| WO | 99/18817 | | 4/1999 |
| WO | 02/39412 | | 5/2002 |
| WO | 03/003331 | | 1/2003 |
| WO | 2004/028826 | | 4/2004 |
| WO | 2005/064574 | | 7/2005 |
| WO | 2006/007356 | | 1/2006 |
| WO | 2007/021375 | | 2/2007 |
| WO | 2007/133906 | | 11/2007 |
| WO | 2008/079952 | A2 | 7/2008 |
| WO | 2009099787 | A1 | 8/2009 |
| WO | 2009/137195 | | 11/2009 |

OTHER PUBLICATIONS

Avery Laminated Identification Cards #5361.
Avery Dennison DuraCard.
Brochure entitled: "Integrated Document Management Software"; Smead Manufacturing Company; Date Unknown; Form No. SLI-95.
Brochure entitled: "Color-Bar a Folders"; Smead Manufacturing Company; Date Unknown.
Brochure entitled: "Color-Bara—Click Stripa Labeling System"; Smead Manufacturing Company; Date Unknown; Form No. SSS-CS-00.
Catalog entitled: "Reseller Catalog Number One"; Smead Software Solutions ; Date Unknown; Form No. SSS-RC1-00.
Disaster Management Systems, Inc., Triage Tag, Copyright 1996, Pomona, California.
Final Office Action for U.S. Appl. No. 11/735,078 dated Jul. 23, 2010.
Final Office Action for U.S. Appl. No. 12/026,030 dated Jun. 28, 2010.
Gretchen Berry, "Wrist Watch," Advance for Healthcare Information Professionals, Feb. 15, 1999.
ID Warehouse (http://web.archive.org/web/20050131235601/http://idwarehouse.com/) Jan. 31, 2005. p. 1: WB1908, Stock Vinyl Wristband.
International Preliminary Report on Patenability (Chapter II) for PCT/US2009/031979 issued May 21, 2010.
International Preliminary Report on Patentability (Chapter I) for PCT/US2008/064972 dated Dec. 1, 2009.
International Preliminary Report on Patentability (Chapter II) for PCT/US2008/059616 dated Jul. 14, 2009.
International Preliminary Report on Patentability (Chapter II) for PCT/US2009/039183 issued Apr. 20, 2010.
International Search Report and Written Opinion for PCT/US2010/030361 dated Jul. 16, 2010.
International Search Report for PCT/US2009/031979 dated Mar. 9, 2009.
International Search Report for PCT/US2009/039183 dated Jun. 25, 2009.
Maryland Department of Transportation, Maryland Emergency Medical Services, Triage Tag, Copyright MIEMMS 1999, Maryland.
Office Action for AU Application 2006280450 dated Sep. 14, 2009.
Office Action for AU Application 2007238028 dated Apr. 19, 2010.
Office Action for AU Application No. 2008202215 dated Dec. 15, 2009.
Office Action for CA Application 2427249 dated Mar. 4, 2010.
Office Action for CN Application 03825215.5 dated Jan. 8, 2010.
Office Action for CN Application 200580019868.5 dated Sep. 4, 2009.
Office Action for EP Application 03773060.3 dated Aug. 11, 2009.
Office Action for EP Application 07842813.3 dated Feb. 4, 2010.
Office Action for JP Application No. 2006-547497 dated Mar. 23, 2010.
Office Action for NZ Application 566071 dated May 7, 2010.
Office Action for U.S. Appl. No. 11/203,601 dated Aug. 17, 2009.
Office Action for U.S. Appl. No. 11/203,601 dated Mar. 30, 2010.
Office Action for U.S. Appl. No. 11/373,923 dated Jan. 21, 2010.
Office Action for U.S. Appl. No. 11/373,923 dated Jul. 13, 2010.
Office Action for U.S. Appl. No. 11/373,923 dated Jun. 1, 2009.
Office Action for U.S. Appl. No. 11/374,273 dated May 26, 2009.
Office Action for U.S. Appl. No. 11/405,149 dated Dec. 28, 2009.
Office Action for U.S. Appl. No. 11/455,131 dated Mar. 9, 2010.
Office Action for U.S. Appl. No. 11/456,928 dated Dec. 8, 2009.
Office Action for U.S. Appl. No. 11/456,928 dated Jun. 15, 2009.
Office Action for U.S. Appl. No. 11/553,872 dated Jun. 17, 2009.
Office Action for U.S. Appl. No. 11/553,891 dated Mar. 19, 2009.
Office Action for U.S. Appl. No. 11/553,891 dated Mar. 8, 2010.
Office Action for U.S. Appl. No. 11/562,114 dated May 6, 2009.
Office Action for U.S. Appl. No. 11/735,078 dated May 28, 2009.
Office Action for U.S. Appl. No. 11/735,078 dated Nov. 17, 2009.
Office Action for U.S. Appl. No. 11/754,812 dated Feb. 9, 2010.
Office Action for U.S. Appl. No. 11/754,812 dated Jul. 24, 2009.
Office Action for U.S. Appl. No. 11/763,615 dated Jan. 22, 2010.
Office Action for U.S. Appl. No. 11/763,615 dated May 6, 2009.
Office Action for U.S. Appl. No. 12/026,030 dated Oct. 8, 2009.
Office Action for U.S. Appl. No. 12/252,710 dated Jun. 10, 2010.
Office Action for U.S. Appl. No. 12/252,710 dated Oct. 15, 2009.
Office Action for U.S. Appl. No. 12/435,541 dated Jul. 7, 2010.
Office Action for U.S. Appl. No. 12/509,151 dated Nov. 13, 2009.
Office Action for U.S. Appl. No. 11/456,928 dated Jun. 8, 2010.
Patent Cooperation Treaty; Partial International Search Report; May 24, 2005.
Patent Cooperation Treaty; Partial International Search Report; Sep. 13, 2004.
Posey Movable I.D. Bracelet; downloaded from http:/www.posey.com/products/4648.html on Aug. 18, 2004.
Sample of Standard Register Label.
Sample of Standard Register Labels.
Standard Register, P.S. Magazine, Fall 1998, Dayton, Ohio.
Office Action for U.S. Appl. No. 12/115,945 dated Aug. 9, 2010.
Office Action for U.S. Appl. No. 12/252,654 dated Aug. 12, 2010.
Office Action for U.S. Appl. No. 11/455,131 dated Aug. 31, 2010.
Office Action for U.S. Appl. No. 12/627,227 dated Aug. 31, 2010.
Office Action for AU Application 2007317692 dated Aug. 12, 2010.
Office Action for AU Application 2006280450 dated Aug. 31, 2010.
Office Action for CN Application 03825215.5 dated Aug. 30, 2010.
Office Action for EP Application 03773060.3 dated Aug. 30, 2010.

* cited by examiner

BUSINESS FORM COMPRISING A WRISTBAND WITH MULTIPLE IMAGING AREAS

CROSS REFERENCE TO RELATED APPLICATION

This application is a division of U.S. patent application Ser. No. 11/405,149 filed on Apr. 17, 2006.

BACKGROUND AND SUMMARY OF THE INVENTION

Wristbands formed by die cuts made in multi-ply forms so as to be processible by printers and especially laser printers are known in the art. One of the inventors herein is an inventor of a number of different wristband forms as shown in his prior U.S. Pat. Nos. 5,933,993, 6,000,160, 6,067,739, 6,438,881, 6,510,634, 6,748,687, 7,017,293 and 7,017,294, the disclosures of which are incorporated herein by reference. Each of the wristbands disclosed in these prior patents are self laminating, meaning that they contain a laminate layer or ply which, when the wristband is separated from its carrier, may be folded over to encapsulate an imaging area typically defined by a die cut in a face stock ply. These imaging areas are desirably sized to extend along a substantial length thereof so as to provide "real estate" for receiving printed data. This printed data may include the patient's name, the attending doctor's name, a patient ID number, admission date, medical information such as special precaution concerns such as allergic reactions, etc., and even more recently a bar code which is swiped numerous times a day. Some are putting photo images of the patient in the imaging area, taking advantage of the recent advances in digital photographic technology. As a result of the desire to put ever increasing amounts of data and even images on the imaging area, the size including especially the length of the imaging area is desirably long.

Although this desire to provide maximum "real estate" for imaging leads to longer imaging areas, the anatomical limits of the patient's wrist around which the wristband wraps create some practical limitations to this length, even for adult sized wristbands. As the imaging area is typically made from a face stock or other print receptive material such as bond paper, it typically exhibits a relative stiffness when compared with the laminate backing ply. This relative stiffness helps the imaging area to lie flat against the wrist so as to enhance the readability of the data imaged onto it. However, as the imaging area is typically a single length of regularly sized face stock, formed into the shape of a rectangle with rounded corners, the imaging area can have a tendency to bow, or assume an arcuate shape, to more closely fit about the patient's wrist especially if the wristband is tightened close to the wrist. While this does present some inconvenience for a nurse or other medical professional seeking to read the information contained in the imaging area, it is more of a problem now that bar codes have come into common usage. That's because bar code readers are better able to accurately read when the bar code is lying flat and not on a curved surface.

In order to further improve on the good and valuable inventions previously developed, patented, and for which great commercial success has been achieved, the inventors herein have succeeded in designing a self laminating wristband along the lines of several of those disclosed and claimed in the patents mentioned above, except that the single imaging area has been formed, preferably, into two or more separated imaging areas. Between each pair of imaging areas, there is created a natural hinge or fold point therebetween which permits the wristband to bend around the wearer's wrist so that each imaging area lies flat against a portion of the wrist instead of "bowing" or even perhaps wrinkling or crinkling at a point of stress determined at random as the wristband is secured and tightened about the wrist. The space between the imaging areas is bridged by two layers of laminate, which necessarily is of a thinner dimension than that formed in the imaging areas as there is no face stock in the intervening space. The types of imaging areas preferably include a main area of larger length and one or more "side car" or auxiliary imaging areas spaced from the main area and arranged along the longitudinal axis of the wristband, or crossways to the wearer's wrist. Alternatively, multiple equally sized imaging areas may be provided. If two smaller auxiliary imaging areas are provided, they preferably are located on either side of the main imaging area.

This side car auxiliary imaging area is preferably a square, although it could be formed in any convenient shape as desired and to suit the individual application. For example, the auxiliary imaging area may be formed in the shape of a circle, or it may be intended to be merely decorative, or it may be intended to receive a trademark or logo or other indicia for identifying an organization or even the individual. This auxiliary imaging area may also be imprinted with any data, as desired or to suit individual needs. For example, the imaging area may be imprinted with a photo of the patient taken by a digital camera upon admission. Or the bar code identifying the patient may be imprinted there. Another example would be for "special precautions" flags or markers to be placed on the auxiliary area. Yet another use for this auxiliary imaging area may be to separate critical patient care data from administrative data. For example, legends such as "Do Not Resuscitate", blood type information, or other important data may be separated from other administrative and identification data to guide the health care provider in the event of an emergency or the like. In other words, this area could be designated as a "look first" zone, and highlighted by the use of color to catch the nurse's eye.

To further implement this special precautions application, printed lines may define target areas of the face stock for adhering matching laminate portions peeled off the laminate ply of the form in which the wristband is carried. In one such example shown in greater detail below, three ellipses are defined by printed lines in the auxiliary imaging area which may be individually used. On the back of the laminate ply are a series of matching ellipses of different color with each color providing an indication of a different special caution condition. Although special precautions indicators are preferably applied prior to laminating the wristband, with this arrangement a special precautions indicator may be added after the wristband has been applied to the patient's wrist which eliminates the need to "re-band" the patient with a new wristband in those instances. There are other uses for the auxiliary imaging area, limited only by the imagination of the designer.

The wristband invention disclosed herein may be provided in a "sheetlet" or envelope sized page containing the wristband and perhaps an extender which, as is explained in the inventor's prior patents, may be used to extend the length of the wristband for those patients having particularly large wrists. Also disclosed herein is the wristband as provided in a "combo" or larger sized page combined with a matrix of a plurality of self adhering labels. Yet another embodiment is a page having four wristbands, two of adult size and two of infant size such as might be used in a maternity or pediatric ward of a medical facility. In these embodiments, the wristband is preferably defined by a plurality of die cuts formed in a two ply business form comprised of a page. The top ply is a face stock or imaging layer, the bottom ply is a laminate layer, and a layer of patterned adhesive joins the two layers. The die cuts are arranged to permit the separation of the unassembled wristband from the page in an assembly, with the laminate ply including a clamshell portion for folding over and encapsulating both imaging areas. In one embodiment shown, a pair of integrally formed, adhesive coated tabs at opposite ends of the wristband are used to attach the wristband to the wearer's wrist, as shown in the inventor's prior patents. In another embodiment, the wristband further includes a cinch attachment, again as is disclosed in several of the inventor's prior patents, generally comprising a strap or tail portion extending to one side of the imaging areas and a slot portion on the opposite side of the imaging areas and through which the tail portion is inserted for securing the wristband. Preferably, a patch of adhesive at the tip of the tail portion is then used to adhere it back onto itself after passing through the slot and finish the attachment of the wristband. The cinch is operably formed in the laminate ply alone.

While the principal advantages and features of the invention have been briefly explained above, a more thorough understanding of the invention may be attained through referring to the drawings and reading the description of the preferred embodiment below.

DETAILED DESCRIPTION OF THE PREFERRED EMBODIMENTS

Figure 1:
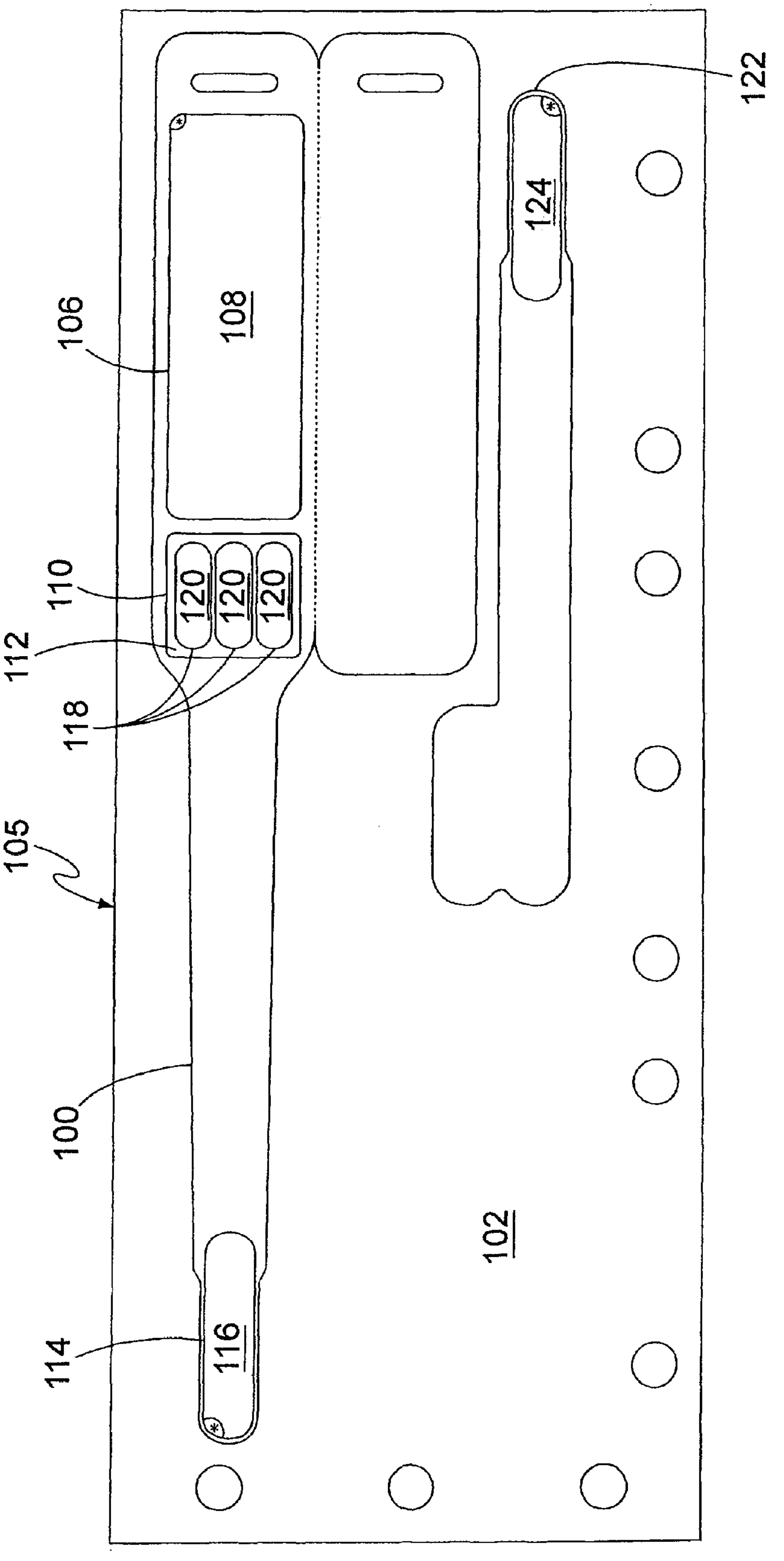
FIG. 1 is a plan view of a sheetlet sized page detailing the die cuts in a face stock ply defining the two imaging areas with the auxiliary imaging area having three printed outlines for identifying special precautions marker target areas and a printed line defining the outline of the entire wristband.
Figure 4:
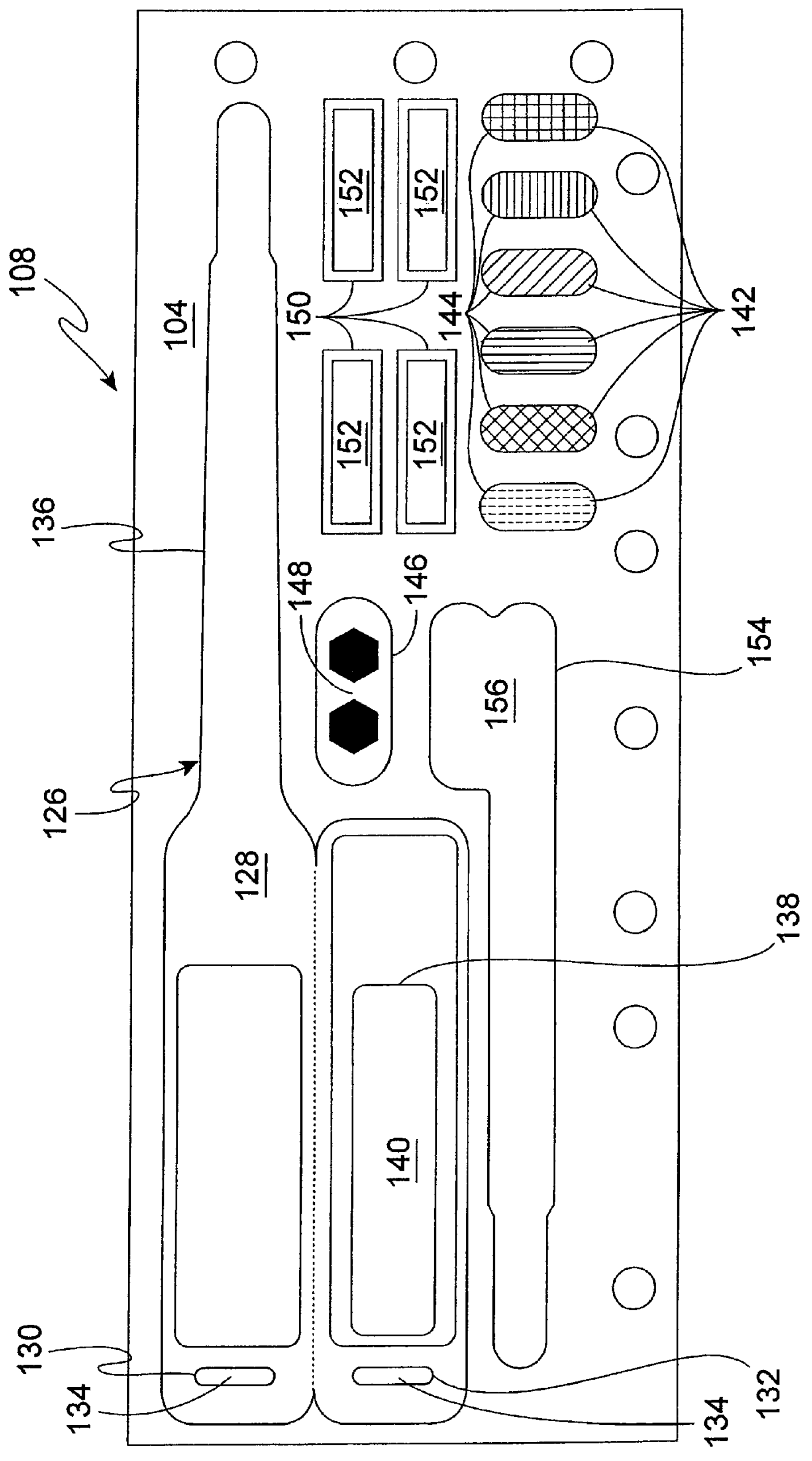
FIG. 4 is a plan view of the back or laminate ply of the sheetlet shown in FIG. 1 with die cuts defining the laminate portion including the cinch tail and slot, special precautions markers, and a security seal.

The wristband 100 of the present invention is shown as a first embodiment in FIGS. 1, 4 as defined by a plurality of die cuts in the face ply layer 102 of FIG. 1 and the laminate ply layer 104 of FIG. 4, both of which comprise a sheetlet sized page 105. As shown in FIG. 1, a first die cut 106 defines a first imaging area 108, a second die cut 110 defines a second side car or auxiliary imaging area 112 and a third die cut 114 defines a removable tab 116 covering of a layer of adhesive for use in securing the wristband as will be explained below. Also as shown in FIG. 1, three separate print lines 118 define three separate ellipse target areas 120 for adhering the special precautions markers described below. These special precautions markers are preferably of different color to indicate a different condition, such as allergies, fall risk, do not resuscitate, etc. Also shown in FIG. 1 is a die cut 122 which defines a removable tab 124 covering of a layer of adhesive for use in securing the extender as is explained in the inventor's prior patents. Upon removal of the wristband 100 from the page 105, the die cuts all separate allowing their defined face ply portions to separate and become part of the separated wristband.

The laminate ply layer 104 as shown in FIG. 4 also has a plurality of die cuts defining the laminating portion 128 of the wristband 100, as will now be explained. A first die cut 126 surrounds and defines the entirety of the laminating portion 128 of wristband 100. This laminating portion is shown as being preferably in a clamshell configuration extending the length sufficient to cover both of the imaging areas. Alternatively, the laminating portion could be shortened to cover only one of the imaging areas, or depending on how many imaging areas are used, less than all of them. Second and third die cuts 130, 132 define slots 134 which along with the tail portion 136 comprise the cinch attachment for the wristband 100. Slots 134 are firmly adhered to the face ply layer 102 so that upon separation of the wristband from the sheetlet 105, they remain adhered thereto thereby creating holes in the laminating portion 128. Also indicated by an outline 138 is a clear area 140 of the laminating portion 128 under which is a layer of release so that upon separation of the wristband and folding over of the bottom half of the laminating portion 128 the clear area 140 is not obscured by any adhesive as it overlies the imaging area 108. Although not shown, a second clear area may be formed to overlie the second imaging area 112. Should printed data be placed on the second imaging area 112, this second clear area would be desired. For the embodiments shown in FIGS. 1 and 3, with special precautions areas or ellipses 120, it is generally desired to coat this area with adhesive to help hold the laminating portion 128 together and in place over the special precautions markers. Additional die cuts 142 define the special precautions ellipses 144, die cut 146 defines a security seal 148, and die cuts 150 define additional markers 152 which may comprise "window pane" highlighters for placement on either imaging area preferably before folding over the laminating portion 128 to help highlight selected printed data. The security seal 148 may be applied over the tail portion of the cinch attachment to not only further secure it but also provide an indication of tampering should a patient try to remove and replace it, such as in an attempt to switch wristbands with another patient. Another die cut 154 defines the extender 156 for extending the length of the wristband 100 through attachment at the end of tail portion 136. A layer of patterned adhesive, not shown, joins the two plies 102, 104 as appropriate and as would be apparent to those or ordinary skill in the art to allow ready separation of the wristband 100 as an assembly of the face ply portions defined by die cuts and the laminating portion 128 and assembly through folding over the two halves of the laminating portion 128 to enclose the imaging areas 108, 112.

Figure 2:
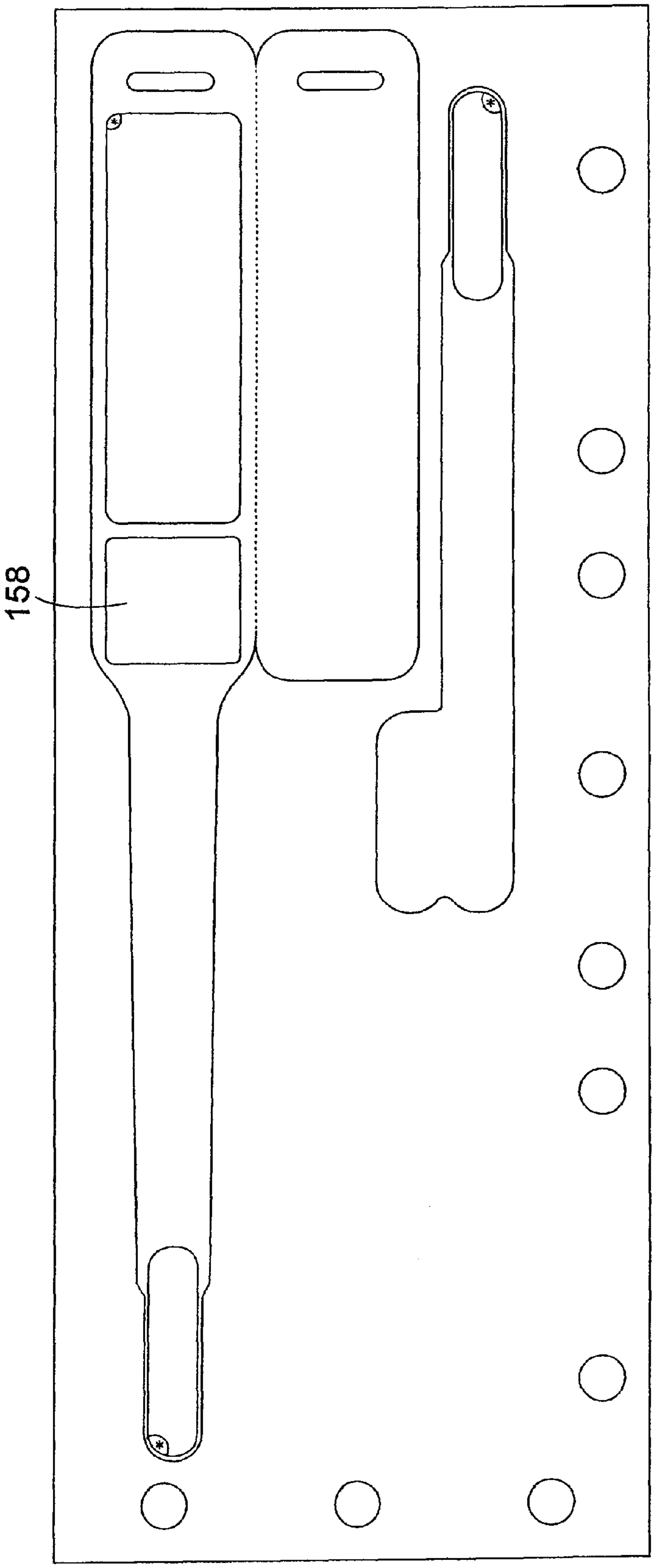
FIG. 2 is a plan view of a sheetlet similar to that of FIG. 1 except with the auxiliary imaging area having no printed lines defining special precautions target areas and instead adapted to receive data imprinted thereon.

As depicted in FIG. 2, the second imaging area 158 may be configured simply as another area for receiving printed information as the sheetlet page 105 is processed through a laser printer prior to separation of the wristband 100 therefrom. Any desired data may be imaged on the second imaging area 158 including for example a photographic image of the wearer, a bar code identifying the wearer, a trademark or logo, etc. Otherwise, the embodiment shown in FIG. 2 is the same as that depicted in FIG. 1.

Figure 3:
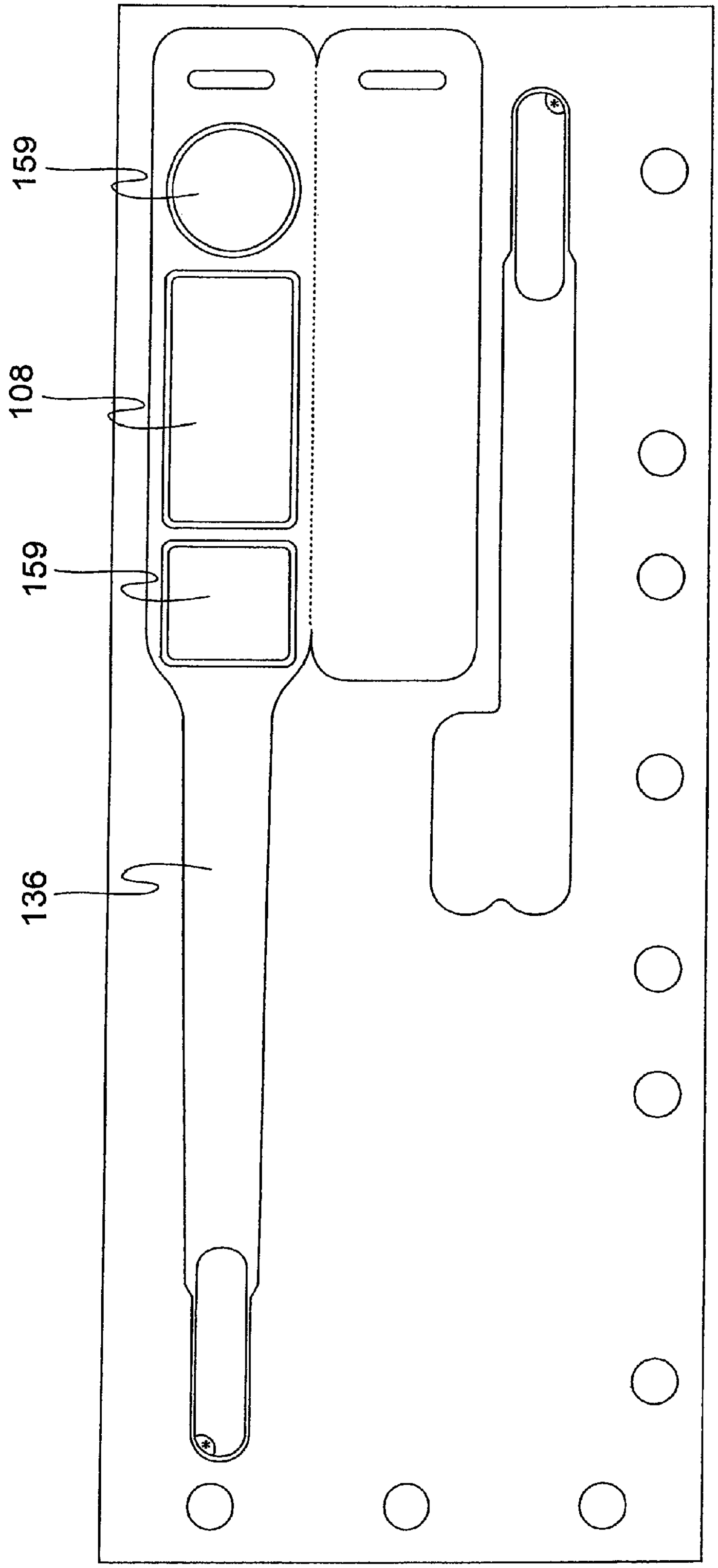
FIG. 3 is a plan view of a sheetlet similar to that of FIG. 1 except that a pair of auxiliary imaging areas are defined by die cuts, with one being substantially square and the second being substantially circular in shape.

As depicted in FIG. 3, a pair of second imaging areas 159, one of which may be formed in the shape of a circle or other decorative design or shape may be provided, with one on either side of the main imaging area 108. In this embodiment wristband, with the shortened clamshell laminating portion and cinch attachment, use of two second imaging areas 159 necessitates a smaller main imaging area 108 in order to yet provide a sufficient length tail portion 136 to properly attach the wristband to a wearer. Alternatively, a longer length imaging area may be provided and reliance made on the extender to attach the wristband.

Figure 5:
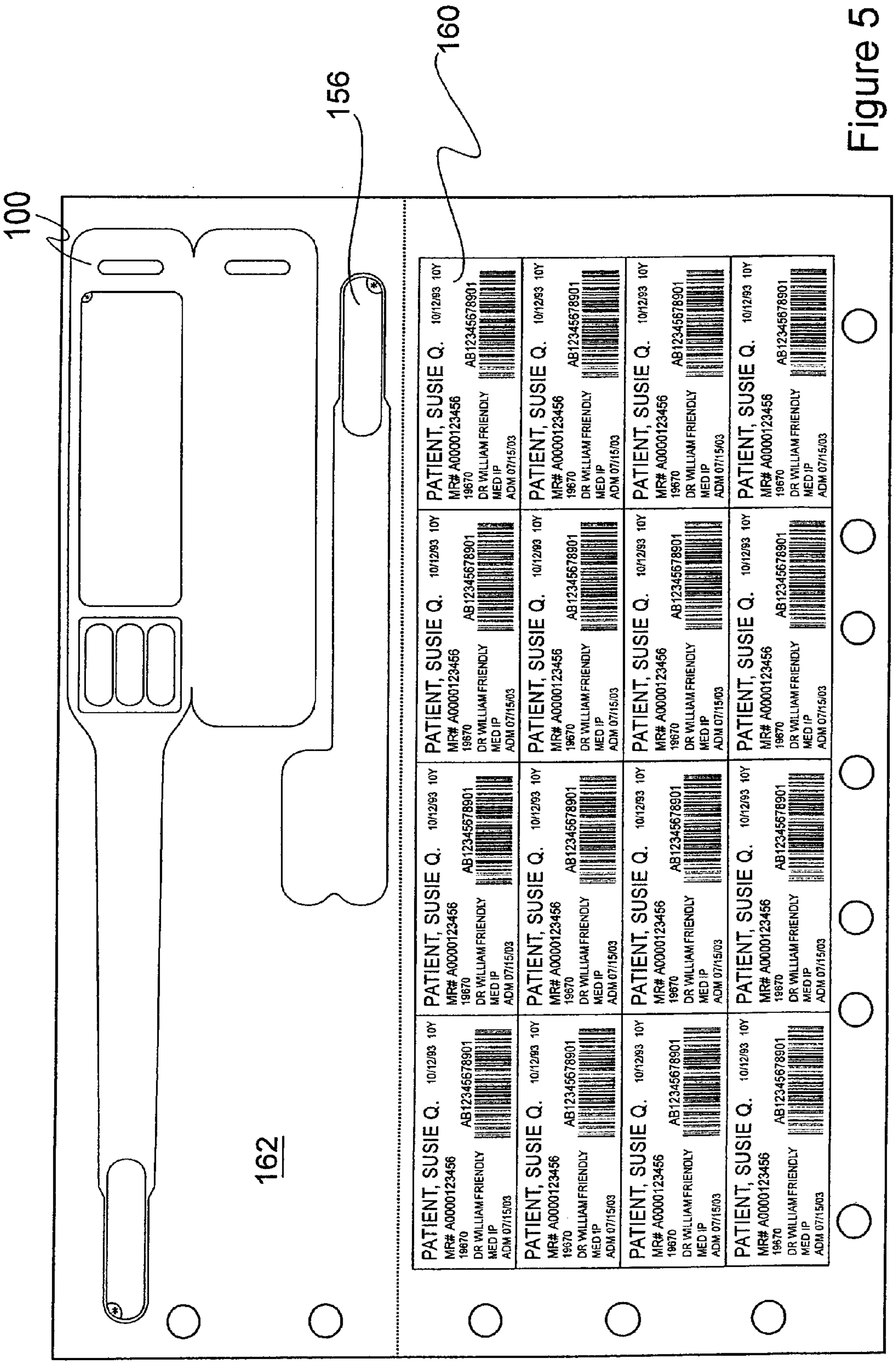
FIG. 5 is a plan view of a full size page, either 8½ by 11 inches or A4 size or any other convenient size, with the wristband of FIG. 1 combined with a matrix of a plurality of self adhering labels.
Figure 6:
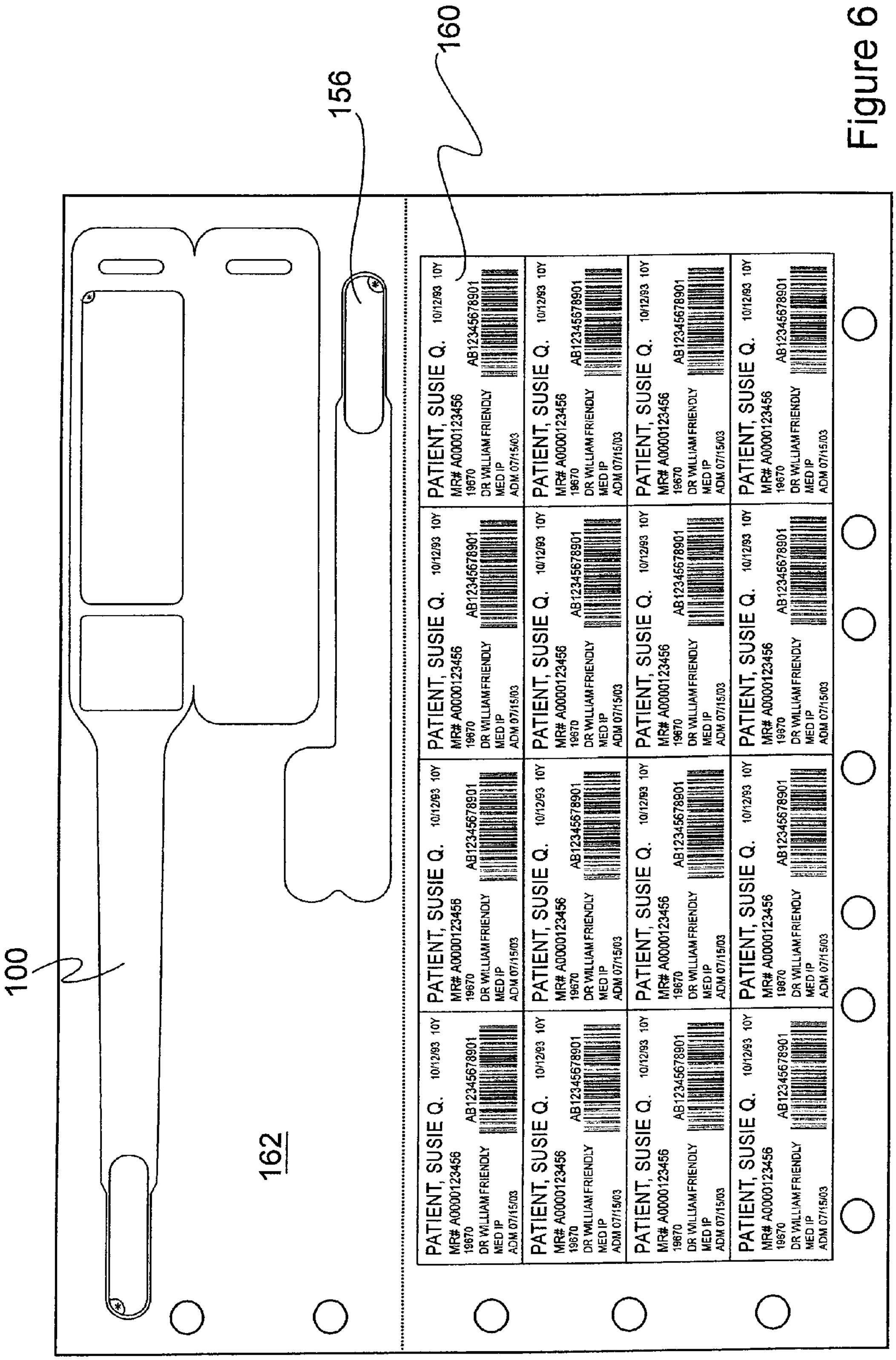
FIG. 6 is a plan view of a full size page, either 8½ by 11 inches or A4 size or any other convenient size, with the wristband of FIG. 2 combined with a matrix of a plurality of self adhering labels.

As depicted in FIGS. 5 and 6, either embodiment of the wristband 100 depicted in FIG. 1, 2, or 3 may be configured as a "combo" form with a matrix of a plurality of self adhering labels 160. In these embodiments, the page 162 is sized appropriately at 8½ inches by 11 inches, A4, or any other convenient size for processing through a printer which is preferably a laser printer. For illustration, lines are depicted in FIGS. 5 and 6 showing the outline of the laminating portion of the wristband which is die cut into the laminating ply which backs this top or face stock ply.

Figure 7:
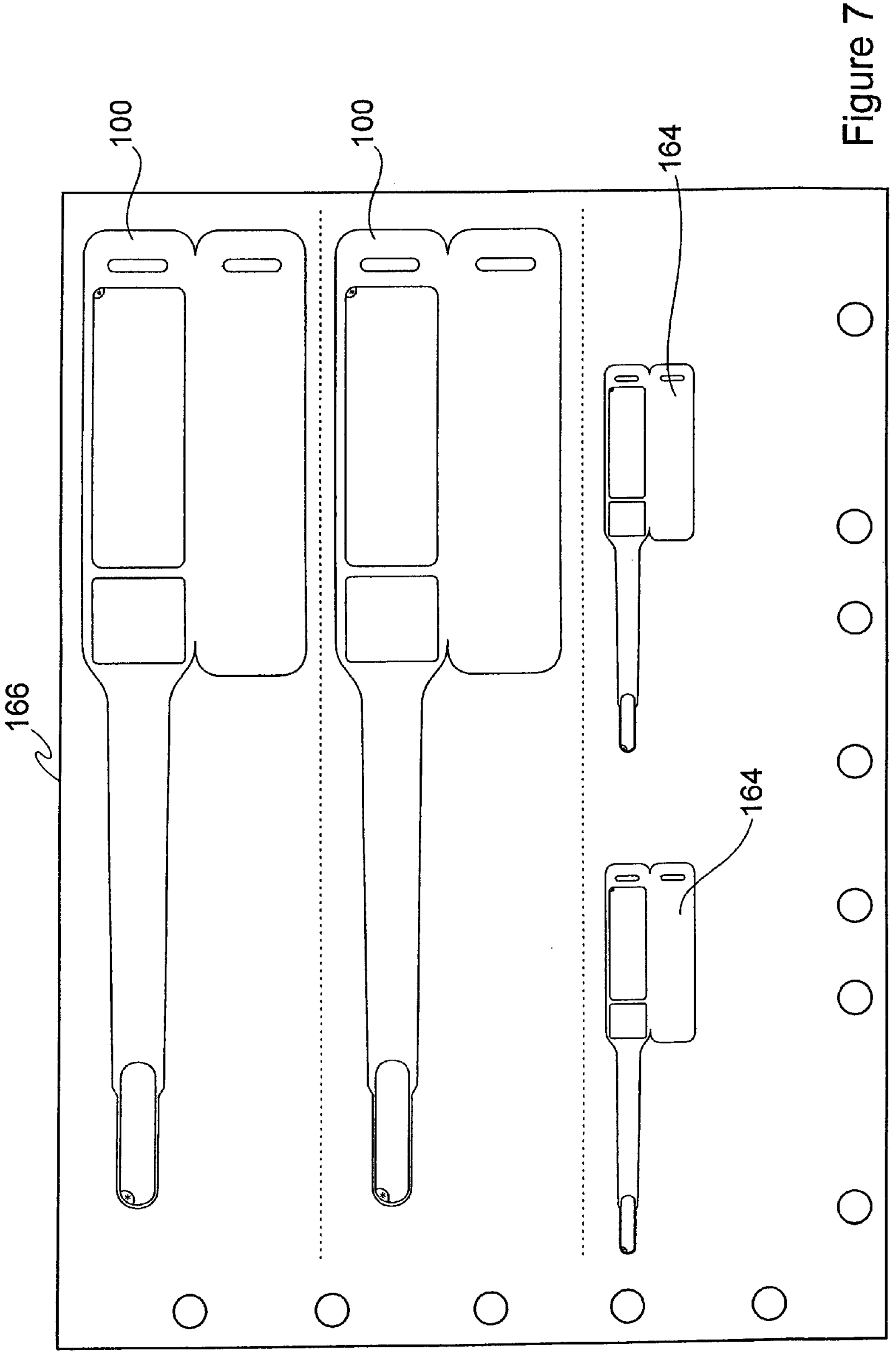
FIG. 7 is a plan view of a full size page, either 8½ by 11 inches or A4 size or any other convenient size, with four wristbands of FIG. 1 provided in adult length and infant length.

Yet another embodiment of the present invention is shown in FIG. 7 and comprises two adult sized wristbands 100 along with two infant sized wristbands 164. The arrangement of the wristbands on the page 166, and the relative sizing of the wristbands, may be adjusted as desired to suit any particular application.

Figure 8:
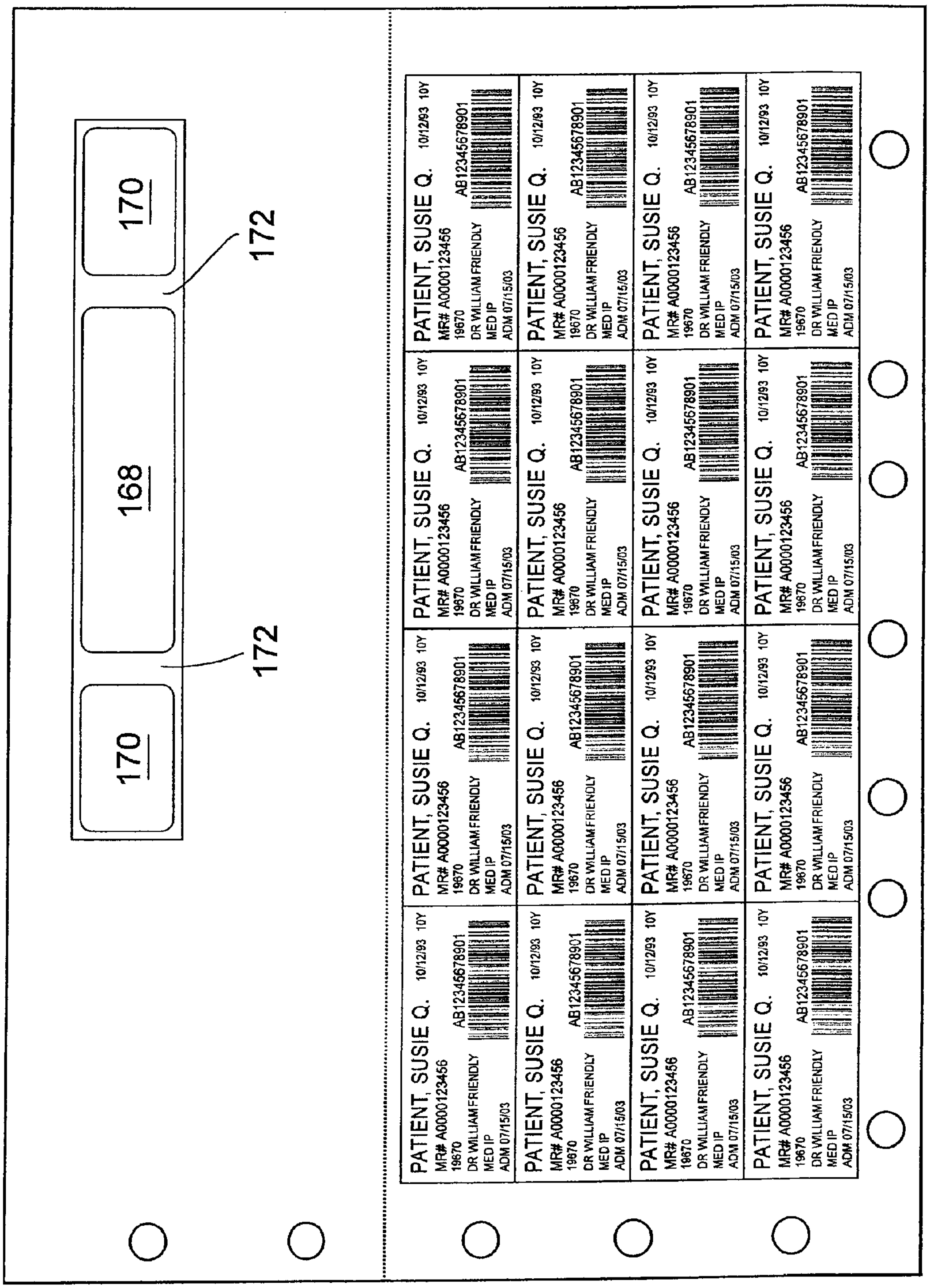
FIG. 8 is a plan view of a full size page business form with both a wristband and labels, with the wristband being of a full length laminate clamshell and integral tab fastener embodiment, and with a pair of auxiliary imaging areas provided one on either side of a main imaging area.

Still another embodiment of the present invention is shown in FIG. 8 and comprises a full size page with a wristband of the type having a full length laminating portion with two integrally formed, adhesive coated tabs at its ends for securing the wristband. With this embodiment, the face ply extends for a greater length along the wristband and there is thus more length of imaging area with which to work with. In this embodiment, a main first imaging area 168 is flanked on either side by a second auxiliary imaging area 170 such that a hinge 172 is formed in two places of the laminate ply along the length of the wristband. Still other alternative versions of this embodiment are depicted in FIGS. 9, 10 which include a somewhat shorter main imaging area 174 and a single second imaging area 176 of rectangular shape to one side thereof; and a main imaging area 178 flanked on either side by a circularly shaped second imaging area 180.

Figure 9:
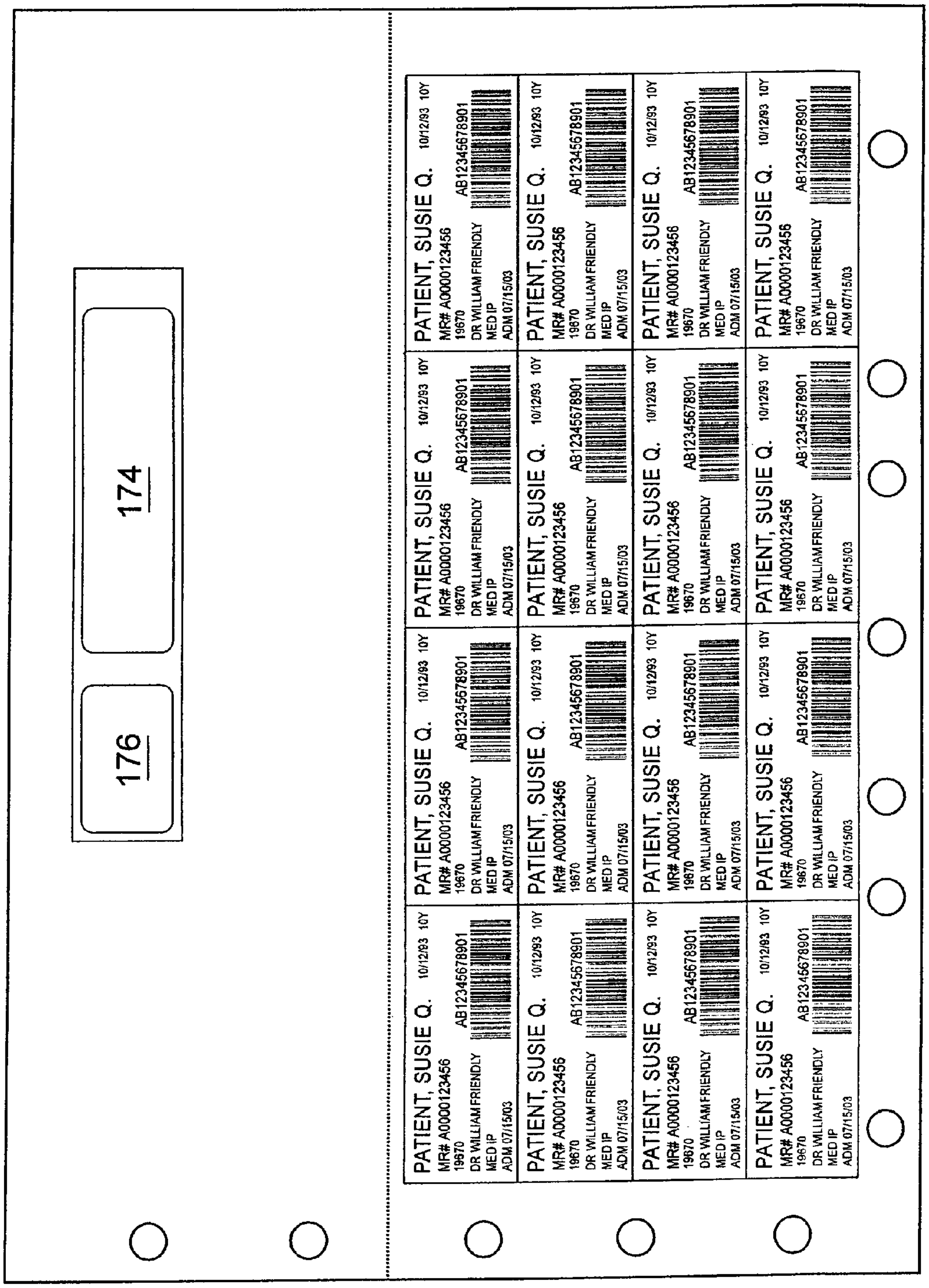
FIG. 9 is a plan view of a full size page business form with both a wristband and labels, with the wristband being of a full length laminate clamshell and integral tab fastener embodiment, and having a main imaging area and an auxiliary imaging area to one side.
Figure 10:
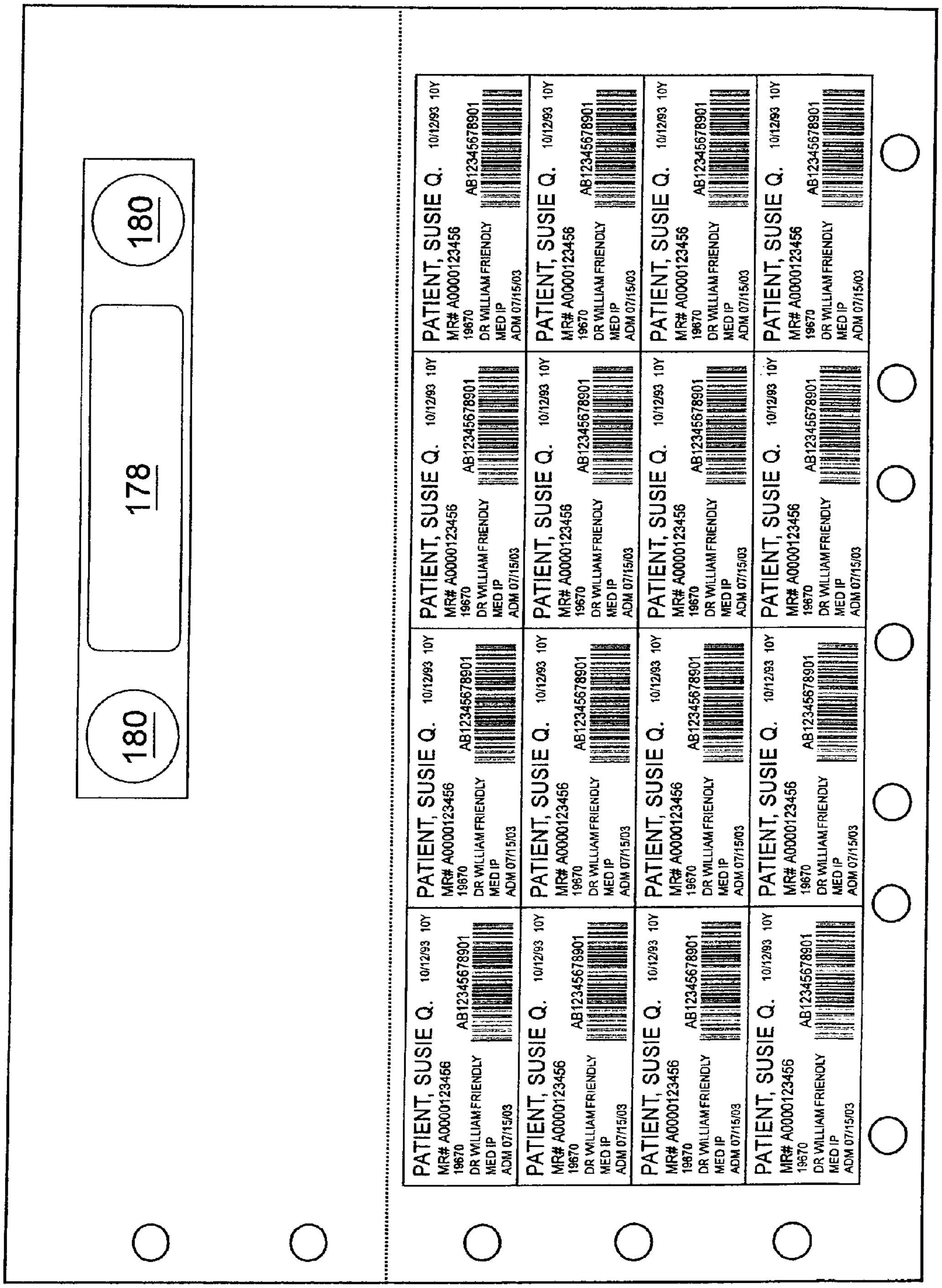
FIG. 10 is a plan view of a full size page business form with both a wristband and labels, with the wristband being of a full length laminate clamshell and integral tab fastener embodiment, and having a main imaging area and a pair of circular auxiliary imaging areas one on each side of the main imaging area.
Figure 11:
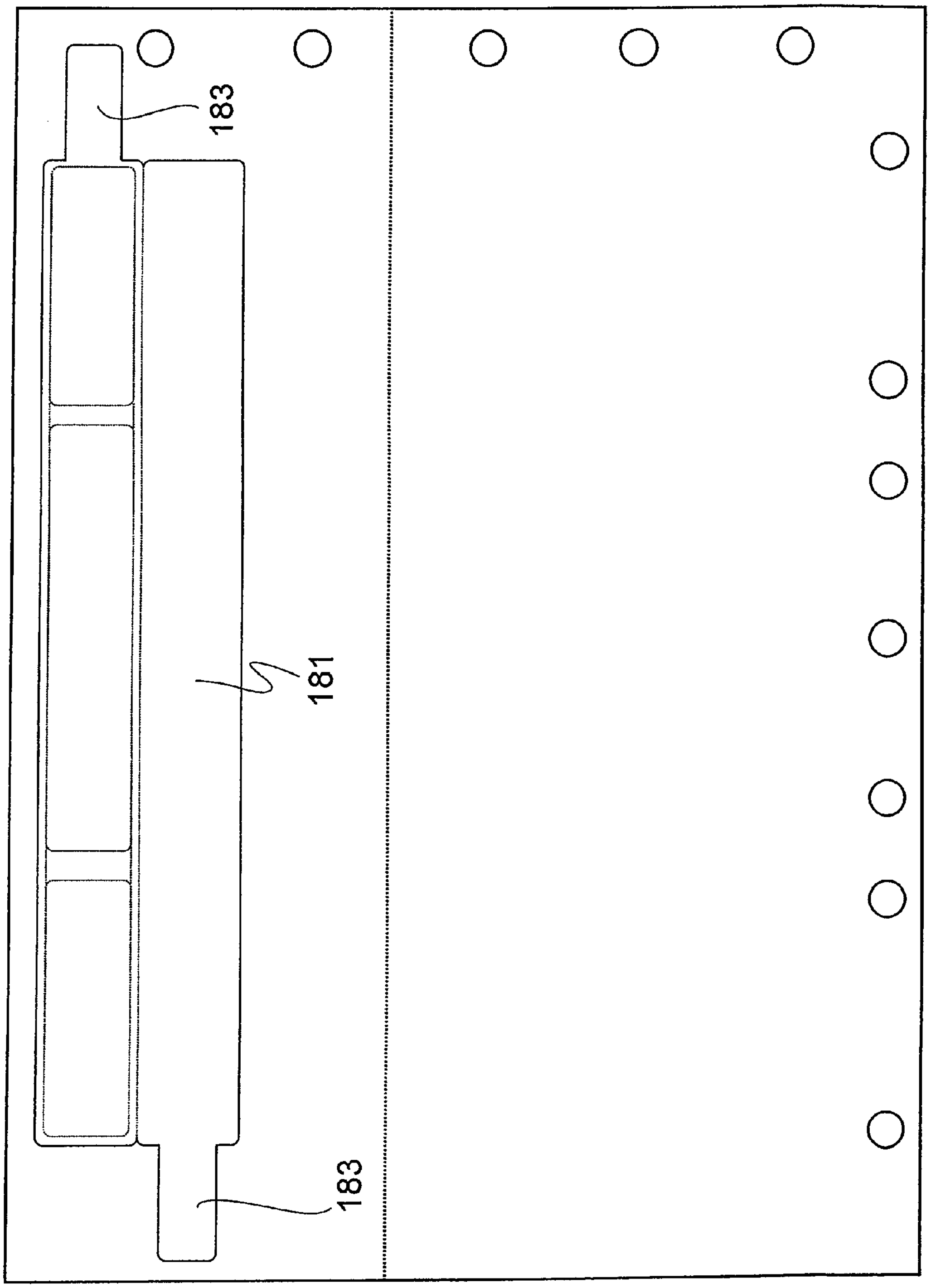
FIG. 11 is a plan view of the back or laminate ply of the full page size sheet of FIGS. 8-10 and illustrate the full length clamshell laminating portion and, as an example, a printed line showing three imaging portions as might be die cut into the face stock ply.

The full length, clamshell laminating portion 181 as would be typically used with the face stock ply depicted in FIGS. 8-10 is shown in FIG. 11. As shown therein, the laminating portion extends substantially the full length of the wristband and has a pair of integrally formed, adhesive coated tabs 183 at its ends for attaching the wristband to a wearer. As an example of the use that could be made of this increased length of imaging area in this embodiment, three imaging areas are shown with a hinge provided between each pair of imaging areas. Alternatively, the laminating portion 181 could be sized to extend less than the full length of the wristband and cover fewer than all of the imaging areas.

Figure 12:
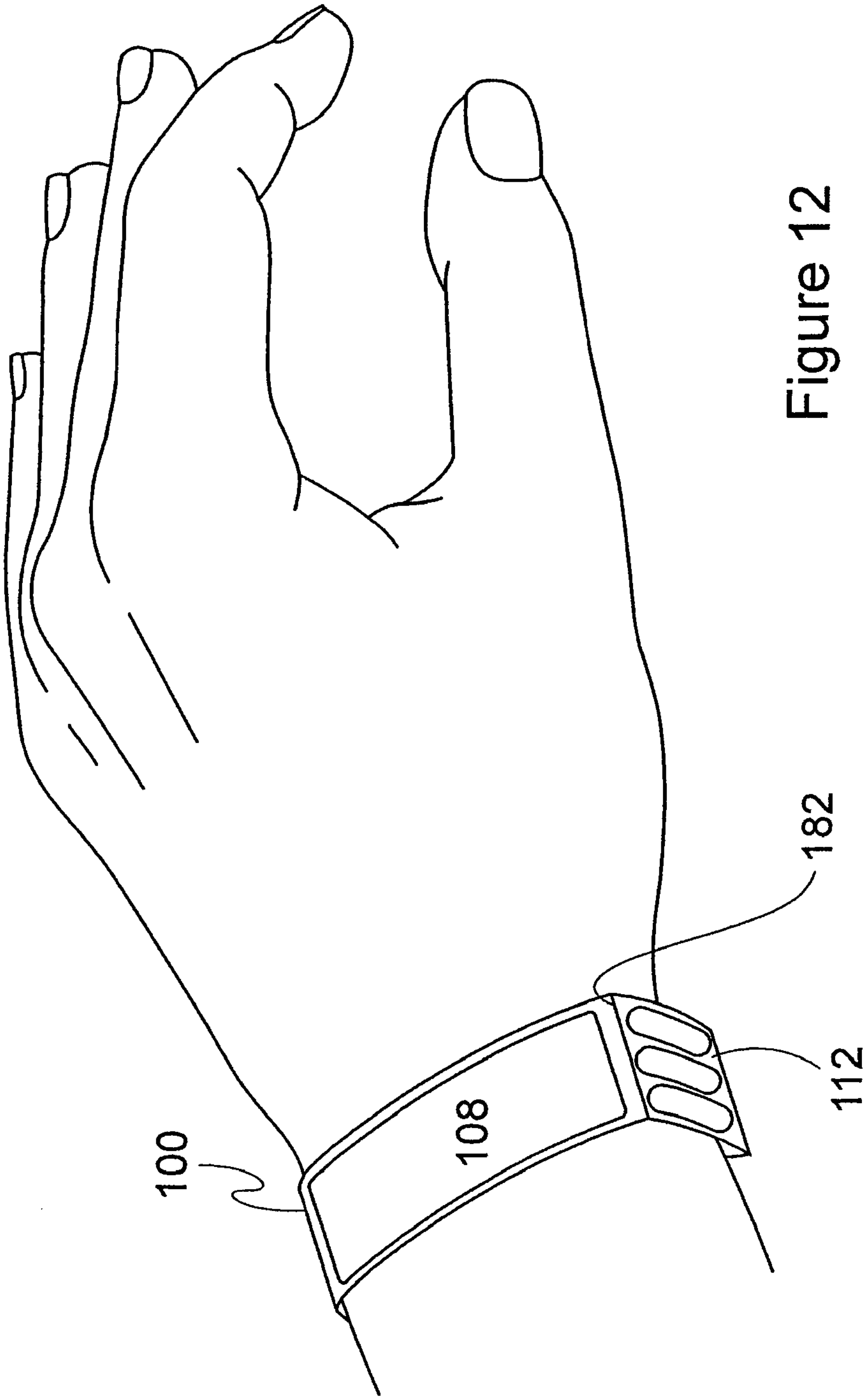
FIG. 12 is a perspective view of the wristband of FIG. 1 applied to a patient's wrist.

Use of the wristband 100 is shown in FIG. 12. As depicted therein, the wristband has been separated from its respective carrier page, assembled through application of several special precautions markers before laminating the imaging areas, and then secured to the wearer's wrist with the cinch attachment. When so applied, the gap separating the second imaging area from the first imaging area along the length of the wristband, and between any two imaging areas or group of imaging areas so arranged, has a natural tendency to fold in the fashion of a hinge, which for clarity has been marked with a line and numbered as 182 in the drawing figure. However, it is not necessary, or preferably provided, that a line or crease or other weakness be created in this gap or intervening space, although one could be provided. With this configuration however, the wristband has a tendency to follow the contour of the wearer's wrist and bend which has the desired effect of allowing the imaging areas to become flatter in orientation than if no such separation were provided between the two imaging areas. This flatter orientation provides for better readability, and especially for reading bar codes. It also provides a natural placement and fit for the wristband to the wearer's wrist as the hinge point naturally orients at a location to accommodate the contour of the wrist. Should more imaging areas be provided along the wristband length, they are preferably positioned to provide a hinge at the location of the wristband where it curves around the wrist, although this is not necessary. It is also noted by the inventors that groupings of imaging areas could be provided, or offset imaging areas, overlapping imaging areas, imaging areas in mixed patterns such as in a diamond shaped or diagonally offset pattern, etc. all of which could contribute to an increased flexibility of the wristband even should a distinct gap not be provided to delineate a hinge point.

The present invention has been disclosed and described in several embodiments. It would be understood by those of skill in the art that various changes and modifications could be made without departing from the spirit and scope of the invention. For example, the imaging areas are depicted as having a particular shape although other shapes could be used. Also, two or three imaging areas are shown but more could be provided. Furthermore, the arrangement of the imaging areas may be changed. The relative size of the imaging areas could be varied. For example, the imaging area are all shown to be of approximately the same width, which is substantially the full width of the wristband. However, different height imaging areas could be provided, with some imaging areas being stacked one above the other, and the hinge feature would only be active between those imaging areas arranged along the length of the wristband. The self laminating clamshell design of various size as disclosed in the inventor's earlier patents has been incorporated into the present design although separated laminating portions could be used and assembled as would be apparent to those of skill in the art. The ellipses arranged on the second imaging area are merely design choices and different shapes or colors for the special precaution markers could be used. The choice of materials is optional and would be those well known to those of skill in the art. Yet other changes could be contemplated, and those as well are to be considered within the scope of the invention which is limited to the scope of the claims and their equivalents.

What is claimed is:

1. A business form comprising a two ply page, a top ply comprising a face stock ply and a bottom ply comprising a laminate ply, a plurality of die cuts in said plies defining a two ply wristband separable from said page, at least some of said die cuts in said face ply defining at least two separated imaging areas in said wristband, each of said imaging areas being adapted to receive printed data, at least some others of said die cuts defining a laminating portion, and a layer of adhesive joining said plies so that said wristband is separable as an assembly from said page by separating said die cuts.

2. The business form of claim 1 wherein the laminating portion comprises a laminating area, said laminating area comprising a clamshell more than approximately twice the size of at least one of the imaging areas and arranged so that it may be folded over to cover said at least two imaging areas, and further comprising a cinch formed in said laminating portion by at least one die cut, said cinch comprising a tail portion and a slot portion through which the tail portion passes to attach the wristband about a wearer's appendage.

3. The business form of claim 1 wherein said imaging areas are aligned along a longitudinal axis of said wristband.

4. The business form of claim 3 wherein said imaging areas comprise a first elongated imaging area and a second substantially square area, and wherein said imaging areas are separated sufficiently so as to form a hinge therebetween.

5. The business form of claim 4 wherein said imaging areas are of substantially the same dimension in a direction transverse to the longitudinal axis of said wristband.

6. The business form of claim 1 further comprising a matrix of a plurality of self adhering labels formed in said page.

7. The business form of claim 1 further comprising a plurality of said wristbands.

8. The business form of claim 7 wherein said wristbands are of at least two different lengths.

9. The business form of claim 1 wherein said laminating portion comprises a laminating area, said laminating area comprising a clamshell more than approximately twice the combined size of the imaging areas and arranged so that it may be folded over to cover all of said imaging areas.

10. The business form of claim 1 wherein said page is approximately envelope sized.

11. The business form of claim 1 wherein said page is approximately 8½ inches by 11 inches.

12. The business form of claim 1 wherein said page is approximately A4 size.

13. The business form of claim 1 wherein said laminating portion includes a clamshell portion extending substantially the entire length of said wristband, said clamshell portion being of sufficient size so as to substantially enclose all of the imaging areas upon being folded over, and a pair of integrally formed, adhesive coated tabs at the ends of said laminating portion for attaching the wristband to a wearer's wrist.

* * * * *

UNITED STATES PATENT AND TRADEMARK OFFICE

CERTIFICATE OF CORRECTION

PATENT NO. : 8,844,972 B2
APPLICATION NO. : 12/819709
DATED : September 30, 2014
INVENTOR(S) : Riley et al.

It is certified that error appears in the above-identified patent and that said Letters Patent is hereby corrected as shown below:

Title page,
Item (73) Assignee: "Saint Louis, MI (US)" should read --St. Louis, MO (US)--.

Signed and Sealed this
Ninth Day of June, 2015

Michelle K. Lee

Michelle K. Lee
*Director of the United States Patent and Trademark Office*